Patented Nov. 14, 1922.

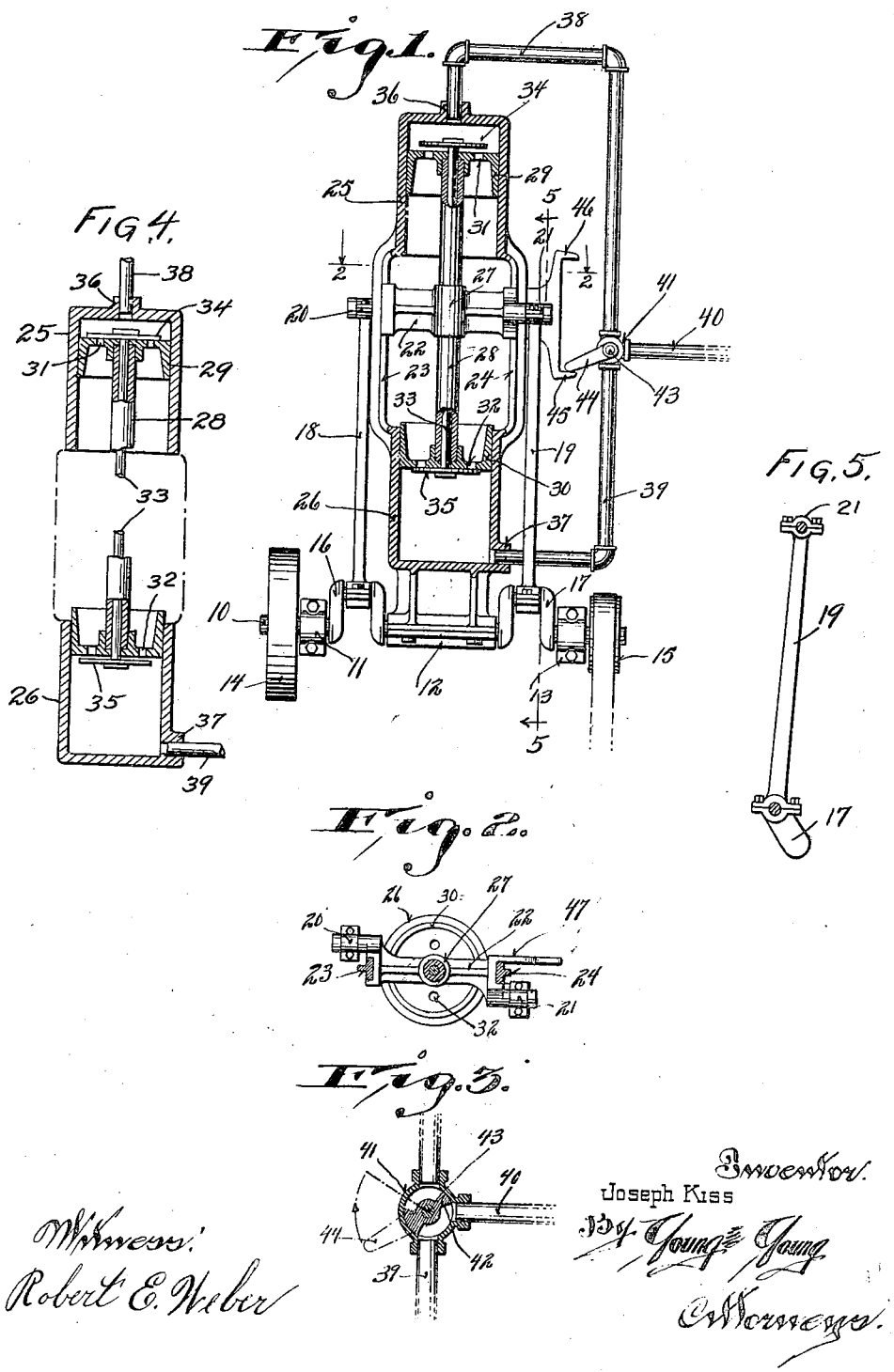

1,435,163

UNITED STATES PATENT OFFICE.

JOSEPH KISS, OF MILWAUKEE, WISCONSIN, ASSIGNOR OF TWO-FIFTHS TO STEVE DODULIK, OF MILWAUKEE, WISCONSIN.

CONTROLLING MEANS FOR FLUID MOTORS.

Application filed October 23, 1920. Serial No. 420,184.

*To all whom it may concern:*

Be it known that I, JOSEPH KISS, a citizen of the United States, and resident of Milwaukee, in the county of Milwaukee and State of Wisconsin, have invented certain new and useful Improvements in Controlling Means for Fluid Motors; and I do hereby declare that the following is a full, clear, and exact description thereof.

This invention relates to fluid motors and more particularly to the means for controlling the valves thereof.

One of the primary objects of the invention is to provide a device more efficient in operation than those now in use, and in which the waste of power shall be reduced to a minimum.

In describing my invention reference will be had to the accompanying drawings, in which:

Figure 1 is a longitudinal sectional view showing the piston near the end of its stroke.

Figure 2 is a detail sectional view on the line 2—2 of Figure 1.

Figure 3 is a sectional detail view showing the three-way valve.

Figure 4 is a view similar to Figure 1, but showing the piston at the beginning of its return stroke, and Figure 5 is a sectional detail view taken on the line 5—5 of Figure 1.

Like reference characters refer to like parts throughout the several views.

The motor comprises a crank shaft 10 mounted in suitable bearings 11, 12 and 13 and carrying the fly-wheel 14 and the pulley 15. In the present instance the crank shaft is provided with two cranks 16 and 17, on which are journalled the ends of the connecting rods 18 and 19. The other ends of the connecting rods are journalled at 20 and 21 on the cross-head 22. This cross-head is slidably mounted on the guide ways 23 and 24, which are formed on the casting which also forms the cylinders 25 and 26. The cross head 22 is formed intermediate its ends with a sleeve 27 within which is fixed a hollow piston rod 28, to the ends of which are attached the piston heads 29 and 30 which co-act with the cylinders 25 and 26 respectively.

The piston heads are provided with vent holes 31 and 32, through which the fluid passes after its energy has been expended. Within the hollow piston rod is a valve rod 33, to the ends of which are fixed the valve heads 34 and 35, which act to open and close the vent holes 31 and 32. The cylinder heads are provided with inlet openings 36 and 37, through which the fluid is directed by means of the pipes 38 and 39 which are connected to the main source of fluid pressure by the pipe 40 by means of the fitting 41 within which the three-way valve 42 is mounted on the pivot pin 43. This valve is provided with the actuating arm 44, which is actuated by the tappets 45 and 46 attached to the cross-head.

The operation may be briefly described as follows:

With the parts in position as shown in Figures 1 and 3 the fluid under pressure will be introduced into the cylinder 26 until the piston is forced far enough for the valve 34 to strike the head of the cylinder 25. This will open the valve 35, and allow the fluid in cylinder 26 to vent. At the same time the three-way valve 42 has been turned to the position shown by dotted lines in Figure 3, so that the fluid is now introduced through the opening 36 into the cylinder 25, and the operation of the piston is reversed.

I have described the structure of my device in detail, but I desire it understood that I do not wish to be limited to the precise structure herein shown and described, but that my invention covers all devices which fall within the scope of the appended claims.

I claim:

1. A fluid motor comprising a double headed piston, a pair of opposed cylinders in which the piston heads reciprocate, an inlet pipe having branches connected with the respective cylinder heads, a three way valve for controlling the communication between the pipe and its branches, means for exhausting each cylinder at the end of the forward stroke of its piston head, an arm extending laterally from said three way valve and an arm secured to the piston and having a pair of tappets engageable alternately with the arm on the valve at the end of the respective strokes of the piston to admit the fluid to the cylinder which is then exhausted.

2. A fluid motor comprising a double headed piston, a pair of opposed cylinders in which the piston heads reciprocate, a cross head secured to the piston, a crank shaft having a pair of cranks, pitmans connecting the respective cranks to the ends of the cross head, an inlet pipe having branches connected with the respective cylinder heads, a three way valve for controlling the communication between the pipe and its branches, means for exhausting each cylinder at the end of the forward stroke of its piston head, an arm extending laterally from said three way valve and a head secured to one end of the cross arm and having a pair of tappets engageable alternately with the arm on the valve at the end of the respective strokes of the piston to admit the fluid to the cylinder which is then exhausted.

3. A fluid motor comprising a double headed piston, cylinders in which said piston heads reciprocate, a three-way valve for controlling the introduction of fluid into said cylinders, means carried by said piston for operating said three-way valve, said piston heads each having holes therein for venting the fluid after its energy has been expended, a valve rod extending longitudinally through said piston, and a valve at each end of said rod for covering vent holes in the corresponding piston head, each of said valves being closed at the end of the stroke by contact with the cylinder head thus opening the valve covering the holes in the other piston head.

4. A fluid motor comprising a double headed piston, cylinders in which said piston heads reciprocate, a three-way valve for controlling the introduction of fluid into said cylinders, means carried by said piston for operating said three-way valve, said piston heads each having holes therein for venting the fluid after its energy has been expended, a valve rod extending longitudinally through said piston, a valve at each end of said rod for covering the vent holes in the corresponding piston head, each of said valves being closed at the end of the stroke by contact with the cylinder head thus opening the valve covering the holes in the other piston head, a cross head carried by said piston, connecting rods pivoted at one end to said cross head, and a crank shaft having two cranks to which the other ends of the connecting rods are journalled.

In testimony that I claim the foregoing I have hereunto set my hand at Milwaukee, in the county of Milwaukee, and State of Wisconsin.

JOSEPH KISS.